Patented Dec. 23, 1952

2,623,015

UNITED STATES PATENT OFFICE 2,623,015

OIL BASE DRILLING FLUIDS

Paul W. Fischer, Long Beach, Calif., assignor to Union Oil Company of California, Los Angeles, Calif., a corporation of California No Drawing. Application October 16, 1950, Serial No. 190,440

11 Claims. (Cl. 252—8.5)

This invention relates to oil base drilling fluids, and in particular concerns oil base drilling fluids adapted for use at relatively high temperatures.

In drilling oil or gas wells by means of rotary drilling tools, a hollow drill pipe known as a drill stem having a bit attached to its lower end is extended downwardly through the well bore and rotated while the bit is pressed against the working face in the formation at the bottom of the hole. The action of the rotating bit grinds away the formation as the drilling progresses. During the drilling, a fluid body known as a drilling fluid or mud is continuously circulated downwardly through the drill stem, through the bit and against the working face of the hole, and thence upwardly through the annular space between the drill stem and the wall of the bore. The drilling fluid serves a number of purposes, among which are cooling and lubricating the drill bit, suspending and removing cuttings from the bore hole, preventing the flow of liquids from formations traversed by the bore into the same by applying a hydrostatic pressure to such formations, and fulfilling other purposes.

In locations where the underground formations traversed and/or penetrated by the bore contain materials such as hydratable clays which swell and/or disintegrate in the presence of water, it has become customary to employ drilling fluids which are more or less free of water in order to preclude the introduction of water into the bore by means of the drilling fluid. Such drilling fluids are termed "oil-base" fluids since they usually comprise a mineral oil or a water-in-oil emulsion having dispersed or suspended therein minor proportions of various agents adapted to impart special properties to the composition. Among such agents, the most universally employed are: weighting agents, which are high density inert solids adapted to increase the apparent density of the base oil and thus increase the hydrostatic head provided by the drilling fluid within the bore; wall-building agents, which are materials such as clay or asphalt adapted to coat or plaster the walls of the bore with an impermeable layer which prevents the escape of the drilling fluid into permeable formations; and dispersing agents which serve to maintain solid components of the fluid uniformly dispersed therein. Oil base drilling fluids may also comprise a variety of other agents such as gel strength improvement agents, viscosity modifiers, emulsifying agents, protective colloids, inorganic salts, etc.

Among the various general types of oil base drilling fluids which have been proposed, those in which the wall-building agent comprises a hydratable clay such as bentonite and the dispersing agent comprises an oil-dispersible metal soap have met with wide commercial acceptance. Such fluids are very readily prepared from relatively inexpensive ingredients, certain of which are often available right at the well site. They are very stable with respect to flocculation, and are not subject to bacterial attack. They have excellent viscosity and gel strength characteristics, and under normal conditions of operation have good fluid loss properties. The latter is an expression of the ability of the fluid to coat or plaster the walls of the bore with a thin impermeable layer of solids which prevents the escape of the fluid into permeable formations traversed by the bore, and constitutes one of the most important attributes of the fluid. It is conveniently measured by determining the so-called "fluid loss value" of the fluid by the procedure described in "Recommended Practice on Standard Field Procedure for Testing Drilling Fluids," API Code No. 29, July 1942. According to such procedure, a sample of the drilling fluid is forced under a pressure of about 100 lbs. per sq. in. and at a temperature of about 100° F. against a permeable membrane or filter. The volume of liquid which passes through the filter in a given period of time, usually one hour, is measured and expressed in milliliters as the fluid loss value of the sample. Ordinarily, it is desirable that a drilling fluid have a fluid loss value of less than about 8 ml./hr. at 100° F.

While the above mentioned soap-stabilized clay-containing oil base drilling fluids enjoy wide commercial use, it has been observed that their fluid loss properties are adversely affected at relatively high temperatures. Thus, while a particular drilling fluid may have a satisfactorily low fluid loss value of, say, 4.0 ml./hr. at 100° F. such value may be as high as 20 ml./hr. or even higher when determined at a temperature of about 200° F. Ordinarily, this is of little consequence since the fluid is not usually subjected to temperatures of such magnitude. In certain locations, however, as well as in bore holes of great depth, the formation temperatures are abnormally high, often in excess of 200° F., and the use of drilling fluids of the aforementioned type under such conditions is accompanied by high loss of fluid into the formations traversed by the bore.

It is accordingly an object of the present invention to provide oil base drilling fluid compositions which have low fluid loss properties at relatively high temperatures.

Another object is to provide oil base drilling fluids suitable for use at abnormally high temperatures.

A further object is to provide means for reducing the high temperature fluid loss value of soap-stabilized oil base drilling fluids.

Other objects will be apparent from the following detailed description of the invention, and various advantages not specifically referred to herein will be apparent to those skilled in the art upon employing the invention in practice.

I have now found that the above and related objects may be realized by incorporating into the drilling fluid a relatively small amount of a drying oil. More particularly, I have found that drilling fluids which essentially comprise minor amounts each of an oil-dispersible metal soap, a hydratable clay, water and a drying oil dispersed in a mineral oil base have excellent fluid loss properties at relatively high temperatures, and are accordingly adapted for use in drilling operations in locations where abnormally high temperatures are encountered. I have further found that the effectiveness of the drying oil in imparting the desired high temperature fluid loss properties to the fluid may be enhanced by providing in the fluid a drying agent of the type known to promote the drying or hardening of drying oils. The invention thus consists in drilling fluids essentially comprising the aforementioned components and prepared as hereinafter more fully explained.

Components

The base oil which forms a major component of the new drilling fluid compositions is preferably of mineral origin and may be crude petroleum or a distillate or residuum material. Heavier materials such as light tars, cracked residua, heavy extracts and the like are especially well suited, particularly when blended with a light distillate such as gas oil, Diesel fuel, etc. A highly satisfactory mixed base of this type comprises a major proportion, e. g., 60-95 per cent, of a relatively heavy oil such as a light residual oil having a specific gravity of about 13°-15° API and a viscosity of about 30-40 SSF at 122° F. and containing substantial amounts of asphaltenes, polymeric bodies and the like, and a minor proportion, e. g., 5-40 per cent, of a light distillate oil such as a Diesel fuel having a specific gravity of about 25°-35° API and a viscosity of about 30-50 SUS at 100° F. The invention, however, is not limited to the use of any particular type of oil or mixtures thereof, and any of the oil bases known in the art may be satisfactorily employed.

The metal soap component which serves to maintain the solid components dispersed in the base oil and to control fluid loss properties may be any of the oil-dispersible metal soaps heretofore employed for such purpose in the formulation of oil base drilling fluids. Preferably, such soaps are alkaline-earth metal soaps of terpenic or long-chain unsaturated aliphatic carboxylic acids, although soaps of other types of acids, e. g. naphthenic and sulfonic acids, may also be employed. Rosin acid soaps, particularly the alkaline-earth metal soaps of modified rosin acids, have been found to be of especial value. Modified rosin acids are well-known in the naval stores art, and are obtained by treating rosin in various ways to modify the resin acids contained therein. For example, wood rosin may be heated under non-oxidizing conditions at temperatures between about 250° and about 350° C. for a length of time sufficient to increase its specific rotation to a value above about +5°. The resulting product closely resembles the original rosin in appearance, but is considerably altered chemically as evidenced by its increased dehydroabietic acid content, lower iodine number, etc. By carrying out the heat treatment at somewhat higher temperatures and/or over longer periods of time, the specific rotation may be raised further and the iodine number further decreased. Under such drastic conditions decarboxylation of the rosin takes place with the formation of unsaponifiable bodies which are usually referred to as rosin oils. Another type of modified rosin is obtained by heating the rosin at relatively low temperatures in the presence of a hydrogenation catalyst but in the absence of added hydrogen as described in U. S. Patent 2,154,629. The reaction which takes place is termed "disproportionation" since it involves the simultaneous hydrogenation and dehydrogenation of abietic-type acids with the consequent formation of dihydroabietic and dehydroabietic acids and their analogues, and the resulting product is referred to in the naval stores art as "disproportionated rosin." Similarly, the product obtained by heating rosin under conditions sufficiently drastic that carboxyl groups are removed from the rosin acids is known as "decarboxylated rosin," and the product obtained by heat-treating rosin under less drastic conditions so that the change effected is primarily one of molecular rearrangement is known as "isomerized rosin." The alkaline-earth metal soaps of any of such modified rosin products, together with the alkaline-earth metal soaps of long-chain unsaturated aliphatic acids, e. g., oleic, linolic, linolenic, palmitolic and elaeostearic acids and mixed acids such as tall oil acids, form a preferred class of soaps for use in preparing the compositions of the invention, although as previously stated any of the oil-dispersible metal soaps heretofore employed in oil base drilling fluid compositions may be employed.

If desired, the oil-dispersible metal soap component may be employed as such in preparing the compositions of the invention. However, it is usually preferred that the soap be formed in situ by metathesis between the corresponding alkali-metal soap and an alkaline-earth metal base, e. g., calcium oxide, calcium hydroxide, barium hydroxide, strontium hydroxide, calcium acetate, etc. Calcium hydroxide, e. g. ordinary hydrated lime, and calcium oxide are preferred by reason of their low cost and general availability. The manner in which the metathesis reaction is carried out is more fully described hereinafter. An alkali-metal soap which has been found particularly suited to such technique is the alkali-metal alkali saponification product of rosin which has been heat-treated at temperatures between about 250° and about 350° C. in the absence of a catalyst to such an extent that it contains only about 50-60 per cent of free resin acids, 30-40 per cent of unsaponifiable oils, and small amounts of phenolic materials, water and products of unknown constitution. A second preferred soap of this nature is the product obtained by heating rosin at a temperature between about 225° and about 300° C. for about 15-60 minutes in contact with a hydrogenation catalyst but in the absence of added hydrogen, distilling the resulting product and collecting a fraction distilling at about 210°-275° C. under about 5-10 mm. pressure, and thereafter saponifying such fraction with aqueous sodium hydroxide in the known manner. Such product is available commercially under the trade name "Dresinate 731."

The drying oil component of the new compositions may be any of the oils of vegetable or animal origin possessing the property of forming a solid elastic film when exposed to the air in thin layers. The term "drying oil" has a well-recognized and definite meaning in the paint and varnish-making art, and it is in this sense that the term is employed in the present specification and claims. Most of such oils are mixed glycerides of unsaturated fatty acids, and have iodine numbers of about 120–200. As examples of common drying oils there may be mentioned linseed oil, tung oil, soya bean oil, oiticica oil, perilla oil, fish oils, cashew nut shell oil, hemp oil, safflower oil, etc. Any of such oils may be employed as herein described.

The hydratable clay component is preferably a high quality material such as bentonite, montmorillonite, or kaolinite, but may be common clay such as is available in almost any locality. Bentonite is preferred. Similarly, the water component should be relatively pure or "fresh," since water containing substantial amounts of dissolved inorganic salts, e. g., salt brines and the like, has an adverse effect on the properties of the composition.

The drying agents which may optionally be included in the compositions may be any of the materials known to accelerate the drying of drying oils. Such materials are referred to in the paint and varnish-making art as "driers," and for the most part are heavy metal salts of unsaturated carboxylic acids. As examples of typical driers there may be mentioned cobalt naphthenate, lead resinate, manganese linoleate, cobalt acetate, iron tungate, etc.

In addition to the foregoing components, the drilling fluids of the invention may optionally comprise a number of other components. Usually, it will be desired that the fluid contain a weighting agent to increase its apparent density. Suitable weighting agents include finely-divided whiting, barytes, iron oxides, lead dust, fuller's earth, calcined clay, calcium carbonate and other high density inert solids, and such agent may be employed in amounts sufficient to provide a composition having an apparent density from about 65 lbs./cu. ft. to as high as 130 lbs./cu. ft.

Proportions

The proportions in which the various essential ingredients are employed in preparing the new compositions may be varied between rather wide limits depending upon the identity of such components and the specific properties desired in the composition. Ordinarily, however, the oil-dispersible metal soap is employed in an amount representing between about 1 and about 10, preferably between about 4 and about 8, per cent by weight of the entire composition. When such soap is prepared in situ by metathesis of an alkali-metal soap and an alkaline-earth metal base, substantially the same proportions of the soap are employed and the base is provided in an amount corresponding approximately to that chemically equivalent to the alkali-metal soap present. When the alkali-metal soap is one of the preferred products hereinbefore described and the alkaline-earth metal base is calcium oxide or hydroxide, the soap is provided in the above-mentioned amount and the base is employed in an amount representing between about 0.1 and about 5, preferably between about 0.4 and about 2, per cent by weight of the entire composition. The drying oil will comprise between about 0.2 and about 5 per cent by weight of the entire composition. When a drying agent or drier is employed, it need be provided only in an amount effective to accelerate drying of the drying oil, e. g. from about .01 to about 0.1 per cent by weight of the entire composition. The hydratable clay is employed in an amount representing between about 0.1 and about 5, preferably between about 0.4 and about 1.2, per cent by weight of the entire composition, and the water is provided in an amount representing between about 0.2 and about 10, preferably between about 1 and about 5, per cent by weight of the entire composition. These proportions of water include any water which may be contained in the soap and/or other components, and accordingly the amount of water actually added during preparation of the composition will be adjusted according to the water content of the other components so that the final composition contains water in the above-mentioned proportions.

Procedure

The exact manner in which the soap, drying oil, hydratable clay and water are dispersed in the base oil is not of primary importance, and if desired the requisite amounts of each of the ingredients may simply be added to the entire quantity of the base oil at ordinary temperatures while employing more or less vigorous agitation or stirring to secure a uniform composition. Such operation may be carried out at the well site in the conventional mud pits with agitation being effected by circulating the mixture from one pit to another. However, it is often more convenient to prepare an initial concentrate composition which can subsequently be diluted with the base oil to obtain the finished drilling fluid. Thus, the soap, drying oil, clay and water may be dispersed in a portion of the base oil to form a relatively thick viscous composition which can be stored and shipped in drums, and subsequently be diluted with the remainder of the base oil to obtain the finished product. When the base oil comprises a mixture of a light and heavy oil, it is preferred that the light oil be employed in forming the initial dispersion.

As previously mentioned, the oil-dispersible metal soap may be formed in situ by metathesis between the corresponding alkali-metal soap and an alkaline-earth metal base. Such procedure is often preferred since it eliminates preparing the alkaline-earth metal soap by a separate step in the many instances in which only the alkali-metal soap of the desired acid is available commercially. More importantly, the drilling fluids prepared by such procedure are often superior with respect to stability and fluid loss properties, possibly because the metathesis reaction does not usually go to completion and the fluid accordingly contains some unreacted water-dispersible alkali-metal soap in addition to the alkaline-earth metal soap. Inasmuch as the extent of the metathesis reaction can not accurately be determined, the relative proportions of water-dispersible and oil-dispersible soaps are thus unknown and the compositions prepared in this manner can be accurately described only in terms of their method of preparation. When employing such procedure, the various components, including the alkaline-earth metal base, may simply be dispersed in the base oil with the aid of efficient agitation. Alternatively, the alkaline-earth metal base may be suspended in a portion of the base oil, after which the alkali-metal soap is added with vigorous stirring. The hydratable clay, water, and drying oil are then added, together with a drier if desired, and stirring is continued to obtain a homogeneous concentrate composition which may subsequently be diluted with the remainder of the base oil. Also, if desired, the concentrate composition may comprise only the alkali-metal soap, drying oil, clay and water dispersed in a portion of the base oil, with the alkaline-earth metal base being added along with the remainder of the base oil at some subsequent time. Weighting agents, gel strength agents and other optional components are usually added along with or subsequent to dilution of the concentrate to form the finished product.

Usually, the drilling fluid compositions of the invention will be prepared by combining the individual components thereof as just described. However, they may also be obtained by suitably modifying previously prepared compositions of the proper type. Thus, any of the drilling fluids which comprise a soap-stabilized mineral oil dispersion of a hydratable clay and water may be modified to improve their high temperature fluid loss properties simply by adding a drying oil in the proportions given above.

The excellent high temperature fluid loss properties of the new compositions become developed to their fullest extent after the elapse of some length of time during which period it is presumed that the drying oil component undergoes its characteristic hardening or drying. If desired, such period of time may be greatly decreased by mildly heating the composition, e. g., at 100°–200° F., either during or after its preparation. Alternatively, the composition may be stored for several weeks at ordinary temperatures prior to use. In most instances, however, it is satisfactory to place the composition directly into use and to allow the fluid loss properties to be developed to their maximum extent during the first few hours of use.

The following examples will illustrate several ways in which the principle of the invention may be applied, but are not to be construed as limiting the same. All proportions are given in parts or per cent by weight.

*Example I*

A typical soap-stabilized oil base drilling fluid is prepared by dispersing 6750 parts of Dresinate 731, 1400 parts of water and 2180 parts of bentonite in a mixed base oil comprising 4780 parts of light Diesel fuel and 2800 parts of light fuel oil. The light Diesel fuel is a typical 400°–720° F. boiling range petroleum fraction, and has an API gravity of about 31° and a viscosity of about 40 SUS at 100° F. The fuel oil is a heavier fraction having an API gravity of about 14.5° and a viscosity of about 36 SSF at 122° F. Approximately 3700 parts of the resulting concentrate composition are diluted with about 33,000 parts of the fuel oil, and there is then added about 76 parts of hydrated lime. The resulting mixture is then stirred for about ½ hour whereby the lime and sodium soap react by metathesis to form the corresponding calcium soap. One per cent of linseed oil is then added and the composition is heated at 200° F. for ten minutes. The resulting composition has a fluid loss value of about 8.6 ml./hr. at 200° F. as compared with a fluid loss value of about 18 ml./hr. at 200° F. for a sample of the drilling fluid from which the linseed oil has been omitted. By extending the heating period to 40 minutes the initial fluid loss value of the composition may be reduced to as low as about 1.0 ml./hr. at 200° F.

*Example II*

The procedure of Example I is followed except that cashew nut shell oil is substituted for the linseed oil. The resulting composition has a fluid loss value of about 3.0 ml./hr. at 200° F.

*Example III*

| | Percent by weight |
|---|---|
| Light mineral oil (36° API) | 34.16 |
| Heavy mineral oil (15° API) | 54.2 |
| Saponified decarboxylated rosin | 4.0 |
| Water | 4.0 |
| Bentonite | 2.0 |
| Calcium resinate | 3.7 |
| Tung oil | 1.2 |
| Cobalt naphthenate | 0.04 |

The saponified decarboxylated rosin product is the potassium hydroxide saponification product of decarboxylated rosin obtained by heating rosin at about 280°–320° C. for 2–4 hours. It is dark-colored highly viscous fluid comprising about 50 per cent of the potassium soaps of modified rosin acids, about 7 per cent of unsaponified rosin acids, about 33 per cent of unsaponifiable rosin oils and about 10 per cent of water.

*Example IV*

| | Percent by weight |
|---|---|
| Crude petroleum (18° API) | 87.3 |
| Sodium tall oil soap | 3.7 |
| Bentonite | 1.8 |
| Water | 4.0 |
| Hydrated lime | 1.0 |
| Fish oil | 2.2 |

*Example V*

| | Percent by weight |
|---|---|
| Mineral oil (22° API) | 83.1 |
| Calcium oleate | 6.7 |
| Water | 2.3 |
| Montmorillonite | 2.7 |
| Perilla oil | 3.4 |
| Aqueous sodium silicate (40%) | 1.8 |

*Example VI*

| | Percent by weight |
|---|---|
| Light petroleum distillate (40° API) | 79.39 |
| Sodium naphthenate | 8.2 |
| Calcium oxide | 2.1 |
| Water | 6.1 |
| Bentonite | 3.3 |
| Linseed oil | 0.9 |
| Manganese resinate | 0.01 |

The above composition is weighted to an apparent density of 88 lbs./cu. ft. by the addition of 200-mesh whiting.

*Examples VII*

| | Percent by weight |
|---|---|
| Light petroleum distillate (36° API) | 84.1 |
| Calcium resinate | 3.7 |
| Water | 8.0 |
| Bentonite | 4.0 |
| Soya oil | 0.2 |

The composition is heated at 200° F. for about 1 hour before being placed into use.

Example VIII

| | Percent by weight |
|---|---|
| Light petroleum distillate (36° API) | 48.0 |
| Heavy petroleum distillate (10° API) | 35.8 |
| Potassium linoleate | 5.6 |
| Hydrated lime | 1.7 |
| Water | 0.8 |
| Bentonite | 4.8 |
| Oiticica | 3.2 |
| Cobalt naphthenate | 0.1 |

Various modifications within the scope of the invention will be apparent to those skilled in the art. Such modifications may include the use of specific hydratable clays, various types of weighting agents, viscosity modifiers, gel strength improvement agents, and various types and blends of base oils, as well as various soap-type stabilizing agents. The essence of the invention lies in the incorporation of a minor amount of a drying oil in drilling fluids comprising a soap-stabilized mineral oil dispersion of a hydratable clay and water for the purpose of improving the high temperature fluid loss properties of the fluid.

Other modes of applying the principle of my invention may be employed instead of those explained, change being made as regards the materials or procedure employed, provided the compositions or steps stated by any of the following claims, or the equivalent of such stated compositions or steps be obtained or employed.

I, therefore, particularly point out and distinctly claim as my invention:

1. An oil-base drilling fluid essentially comprising a mineral oil base having dispersed therein between about 1 and about 10 per cent by weight of an oil-dispersible metal soap, between about 0.1 and about 5 per cent by weight of a hydratable clay, between about 0.2 and about 10 per cent by weight of water, and between about 0.2 and about 5 per cent by weight of a drying oil.

2. The composition of claim 1 wherein the soap is an alkaline-earth metal rosin soap.

3. The composition of claim 1 wherein the soap is a calcium rosin soap.

4. The composition of claim 1 wherein the drying oil is linseed oil.

5. An oil-base drilling fluid essentially comprising a mineral oil base having dispersed therein between about 1 and about 10 per cent by weight of an oil-dispersible metal soap, between about 0.1 and about 5 per cent by weight of a hydratable clay, between about 0.2 and about 10 per cent by weight of water, between about 0.2 and about 5 per cent by weight of a drying oil, and between about 0.01 and about 0.1 per cent by weight of a drying agent.

6. An oil-base drilling fluid prepared by dispersing in mineral oil between about 1 and about 10 per cent by weight of an alkali-metal soap, an amount of an alkaline-earth metal base approximately equivalent chemically to said alkali-metal soap, between about 0.1 and about 5 per cent by weight of a hydratable clay, between about 0.2 and about 10 per cent by weight of water, and between about 0.2 and about 5 per cent by weight of a drying oil.

7. The composition of claim 6 wherein the alkaline-earth metal base is selected from the class consisting of calcium hydroxide and calcium oxide.

8. The composition of claim 7 wherein the alkali-metal soap is an alkali-metal rosin soap.

9. The composition of claim 7 wherein the alkali-metal soap is an alkali-metal alkali saponification product of rosin which has been heat-treated under conditions of time and temperature sufficient to raise its specific rotation to a value above about $+5°$.

10. The composition of claim 7 wherein the alkali-metal soap is the sodium hydroxide saponification product of the material obtained by heating rosin at a temperature between about 225° and about 300° C. in contact with a hydrogenation catalyst but in the absence of added hydrogen and thereafter distilling the resulting product and collecting the fraction distilling at about 210°–275° C. under 5–10 mm. pressure.

11. The composition of claim 7 wherein the alkali-metal soap is a potassium hydroxide saponification product of decarboxylated rosin and comprises about 50 per cent by weight of potassium soaps of modified rosin acids, about 7 per cent by weight of unsaponified rosin acids, about 33 per cent by weight of unsaponifiable rosin oils, and about 10 per cent by weight of water.

PAUL W. FISCHER.

REFERENCES CITED

The following references are of record in the file of this patent:

UNITED STATES PATENTS

| Number | Name | Date |
|---|---|---|
| 2,217,926 | Van Campen | Oct. 15, 1940 |
| 2,239,498 | Cannon | Apr. 22, 1941 |
| 2,542,019 | Fischer | Feb. 20, 1951 |